H. MOEGGENBORG.
HAY TEDDER ATTACHMENT FOR MOWING MACHINES.
APPLICATION FILED MAY 9, 1914.
1,124,499.
Patented Jan. 12, 1915.
2 SHEETS—SHEET 1.
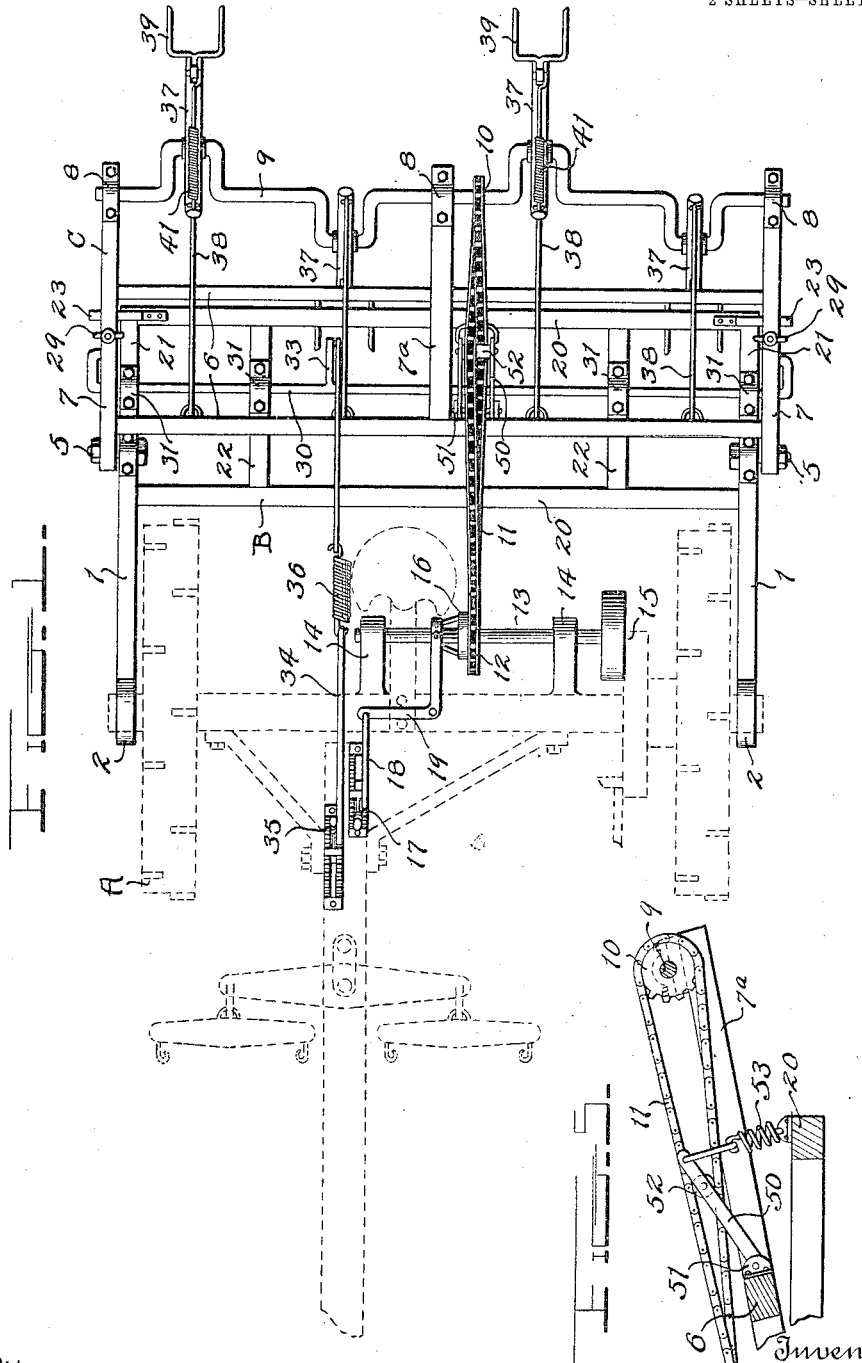
Witnesses
Harry B. Rook.
Harriet B. Cornwall.
Inventor
H. Moeggenborg
By H. S. Hie
Attorney

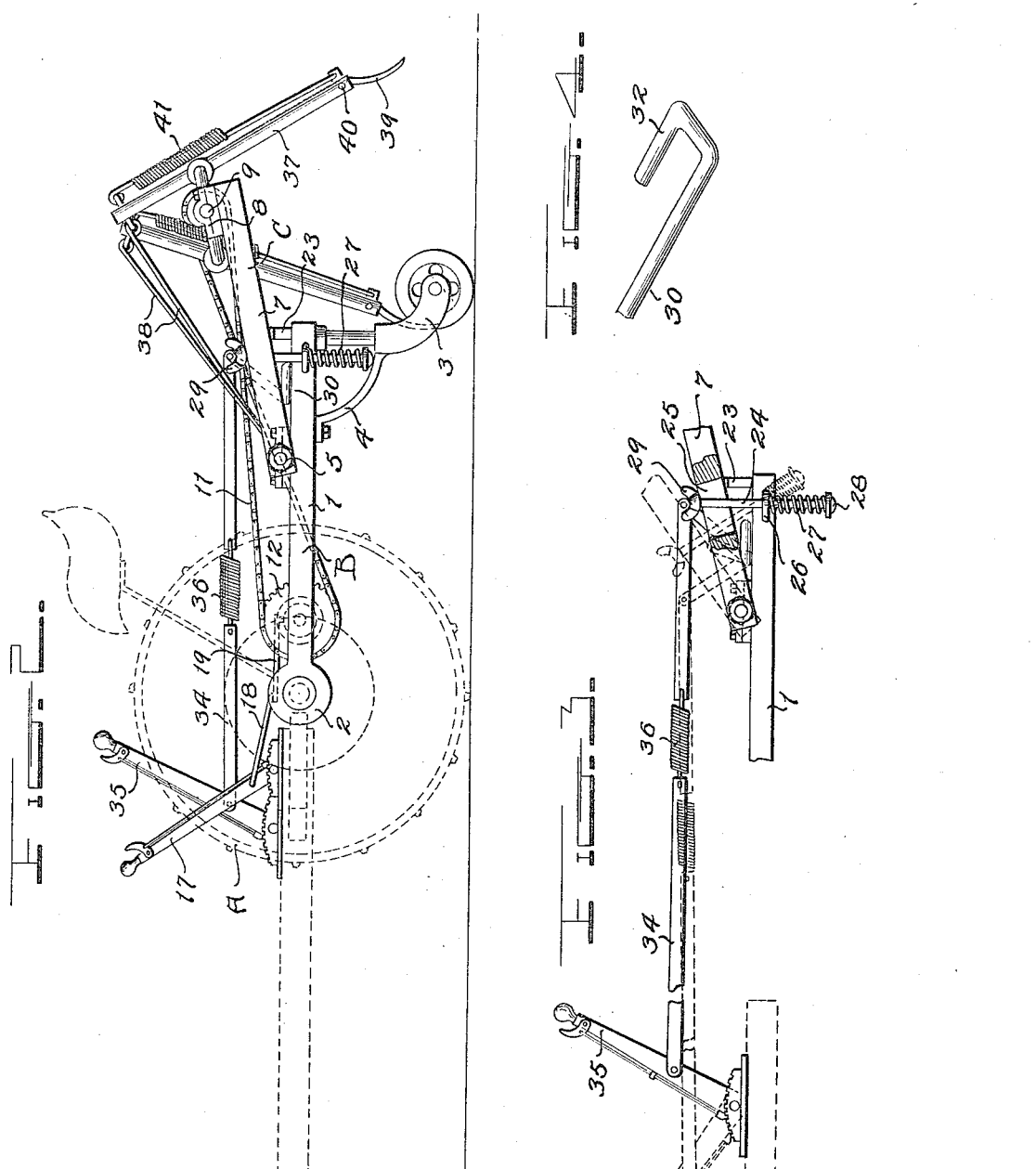

UNITED STATES PATENT OFFICE.

HENRY MOEGGENBORG, OF FOREST HILL, MICHIGAN.

HAY-TEDDER ATTACHMENT FOR MOWING-MACHINES.

1,124,499.

Specification of Letters Patent.

Patented Jan. 12, 1915.

Application filed May 9, 1914. Serial No. 837,524.

*To all whom it may concern:*

Be it known that I, HENRY MOEGGENBORG, a citizen of the United States, residing at Forest Hill, in the county of Gratiot and State of Michigan, have invented certain new and useful Improvements in Hay-Tedder Attachments for Mowing-Machines, of which the following is a specification.

The present invention relates to a hay tedder attachment for mowing machines, and has for its object to provide a device of this character which can be readily applied to a mowing machine so as to eliminate the necessity of going over the field a second time with a tedder, and which embodies novel features of construction whereby the tedding mechanism can be readily raised and lowered and thrown into and out of gear as found necessary.

A further object of the invention is to provide a hay tedder attachment for mowing machines which is comparatively simple and inexpensive in its construction, which can be readily applied to any conventional form of mowing machine and will not materially increase the draft thereof, and which will act in an effective manner upon the newly mown hay to lift the same and expose it to the action of the sun and air so that it will cure quickly.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a top plan view of a hay tedder attachment for mowing machines constructed in accordance with the invention, the mowing machine to which the attachment is applied being indicated diagrammatically by dotted lines. Fig. 2 is a side elevation of the same, with the belt tightener omitted. Fig. 3 is a detail view of the mechanism for raising and lowering the swinging frame upon which the kickers of the tedder are mounted. Fig. 4 is a detail perspective view of one end of the crank shaft which is provided for raising and lowering the swinging frame. Fig. 5 is a detail view of the belt tightening device.

Corresponding and like parts are referred to in the following description and indicated in all the views of the drawing by the same reference characters.

Referring to the drawings, the letter A designates a mowing machine which may be of any conventional construction and is shown diagrammatically by dotted lines, since it constitutes no part of the present invention. The tedder attachment includes a main frame B and a swinging frame C which is mounted upon the main frame so as to be swung up and down, the rear end of the swinging frame projecting beyond and overhanging the rear end of the main frame. The main frame B is substantially horizontally disposed and is provided at opposite ends thereof with the forward extensions 1 which are adapted to be connected in any suitable manner as by means of the coupling members 2 to the ends of the mowing machine axle. The rear end of the main frame B is supported by caster wheels 3, suitable bracing 4 being provided for holding the caster wheels in an upright position.

The swinging frame C has the forward end thereof pivotally connected by means of suitable pivot bolts 5 to opposite ends of the main frame B. This swinging frame C is shown as composed of a pair of transverse bars 6 connected by the end bars 7 and an intermediate brace member 7ª which is parallel to the said end bars.

Both the end bars 7 and intermediate brace member 7ª project rearwardly from the transverse bars 6 and are provided with suitable bearings 8 within which the tedder shaft 9 is journaled. A sprocket wheel 10 is provided upon this shaft 9, said sprocket wheel being connected by a chain 11 to a second sprocket wheel 12 on a drive shaft 13 which is journaled within suitable bearings 14 on the mowing machine and receives power from the mowing machine mechanism in any suitable manner as by means of the gearing 15.

A clutch 16 of any suitable construction is provided for locking the gear wheel 12 with the drive shaft 13 or permitting it to turn loosely thereon. This clutch is controlled by means of a lever 17 which is connected by a link 18 to one arm of a bell crank lever 19, the other arm of the said bell crank lever being connected to the clutch 16. With this construction it will be obvious that by suitably manipulating the hand lever 17 the tedder mechanism can be thrown into or out of gear, as desired.

The main frame B comprises transverse bars 20 connected by the end pieces 21 and intermediate brace members 22 parallel to the end pieces. The rear corners of the main frame B are provided with spring arms or strips 23 the free ends of which engage the swinging frame C and normally tend to move the same upwardly. It will also be observed that a pair of spring plungers 24 are pendent from the ends of the swinging frame C and offer a yielding resistance to the upward swinging movement of the frame C. These bolts 24 are shown as loosely connected to the frame C and as passing through slots 25 therein, said bolts passing through suitable guide members such as the screw eyes 26 upon the main frame B and being surrounded by coil springs 27 which are interposed between the screw eyes 26 and the heads 28 at the lower ends of the plungers.

The upper ends of the plungers or bolts 24 are shown as capped by thumb nuts 29 which can be adjusted to regulate the tension of the springs 27. These spring plungers in connection with the spring arms 23 of the main frame B provide a yieldable mounting for the tedder mechanism so that all objectionable shocks and jars are absorbed.

A rock shaft 30 extends transversely across the main frame B and is journaled within suitable bearings 31 thereon, the two extremities of the rock shaft being returned at 32 to provide crank portions which functionally engage the swinging frame C and provide a means for positively lifting the same to move the tedding mechanism into inoperative position.

At an intermediate point in its length the rock shaft 30 is provided with an arm 33 which is connected by a link 34 to a lever 35 on the mowing machine. If found desirable a spring 36 may be interposed in the length of the link 34. The action of the spring plungers or bolts 24 normally holds the swinging frame C down in operative position, although when the operator manipulates the lever 35 to rotate the rock shaft 30, the crank arms 32 at opposite ends thereof engage the swinging frame C to move the same upwardly, as indicated by dotted lines on Fig. 3. The hay tedding mechanism is then in inoperative position, and the clutch 16 would be simultaneously opened so as to prevent the transmission of power to the tedder shaft.

The tedder mechanism itself is of the conventional construction. A series of kickers 37 are mounted upon the crank portions of the tedder shaft 9, the upper ends of the kickers being connected by the usual links or rods 38 to the forward transverse bar 6 of the upper frame. The forks 39 of the kickers are mounted in the conventional manner, being pivoted at 40 and normally held in operative position by the spring members 41. This manner of mounting enables the forks to swing rearwardly without breakage in the event a stone or other obstacle is encountered on the downward movement.

In the operation of the device it will be obvious that as the mowing machine is advanced across a field with the tedder attachment in operative position, the kickers will act upon the swaths of hay to loosen the same and enable the sun and air to act upon the hay in the most effective manner. The spring mounting for the swinging frame serves to absorb all appreciable shocks and jars, while by means of the rock shaft 30 the frame can be quickly swung upwardly at any time to move the tedding mechanism into inoperative position. Furthermore, the entire attachment can be readily applied to or removed from the mowing machine and does not materially increase the draft of the mowing machine.

If desired a belt tightener such as is shown by Fig. 5 may be employed for holding the chain 11 taut and taking up the looseness therein when the swinging frame C is moved upwardly. This belt tightener includes an arm 50 which is pivotally connected as at 51 to the bar 6 of the swinging frame C, and carries a roller 52 which engages the lower reach of the chain 11. The outer end of the arm 50 is connected by a spring 53 to the bar 20 of the lower frame B. This spring serves to hold the roller 52 in engagement with the chain 11 so as to take up any slack in the same, and prevent the same from hanging loose when the upper frame C is swung upwardly to move the tedders into inoperative position.

Having thus described the invention, what I claim as new and desire to secure by Letters Patent, is:—

The herein described tedder attachment for mowing machines including a tedder frame adapted to trail behind a mowing machine, coupling means for connecting the forward end of the tedder frame to the mowing machine, supporting means for the rear end of the tedder frame, a superposed swinging frame mounted upon the tedder frame and having the forward end thereof pivotally connected to the tedder frame while the rear end thereof overhangs and projects rearwardly beyond the same, a tedder shaft journaled upon the superposed swinging frame, kickers upon the tedder shaft, means for driving the tedder shaft, plungers carried by the swinging frame and having a sliding engagement with the tedder frame, springs mounted upon the plungers and engaging the tedder frame so as to tend to move the swinging frame downwardly, a transversely disposed rock shaft journaled upon the main frame at a point under the superposed swinging frame, the extremities of the rock shaft projecting beyond the sides of the tedder frame and being returned to provide crank portions disposed substantially parallel to the body of the shaft and having a direct sliding engagement with the superposed swinging frame, and means for actuating the rock shaft to bring the crank portions thereof into engagement with the superposed swinging frame so as to move the same upwardly against the action of the before mentioned springs.

In testimony whereof I affix my signature in presence of two witnesses.

HENRY MOEGGENBORG.

Witnesses:
VIRGIL W. McCLINTIC,
AUGUST MOEGGENBERG.

Copies of this patent may be obtained for five cents each, by addressing the "Commissioner of Patents Washington, D. C."